(No Model.) 2 Sheets—Sheet 1.
C. W. BALDWIN.
CONTROLLING DEVICE FOR ELEVATORS.
No. 529,438. Patented Nov. 20, 1894.
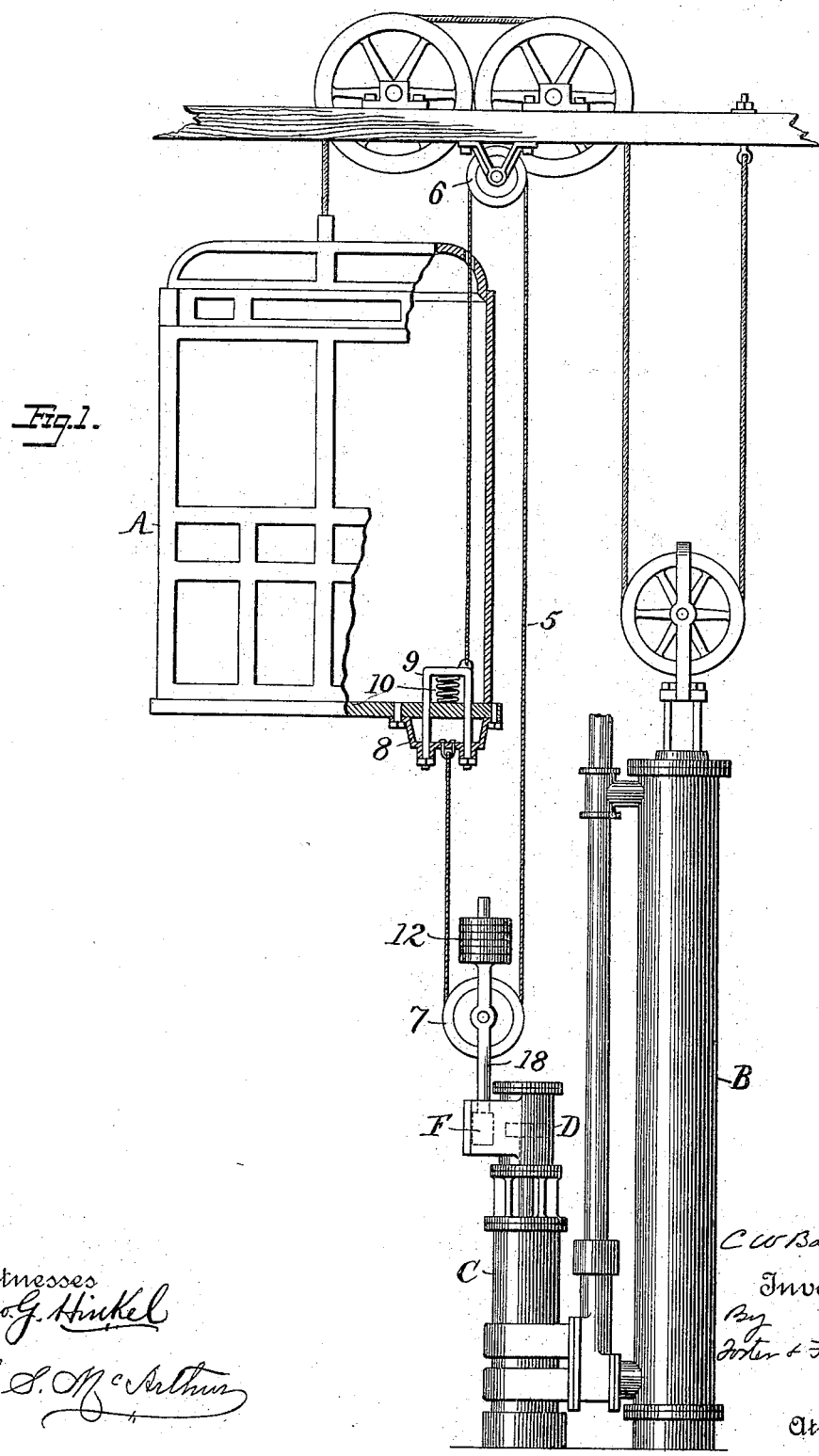

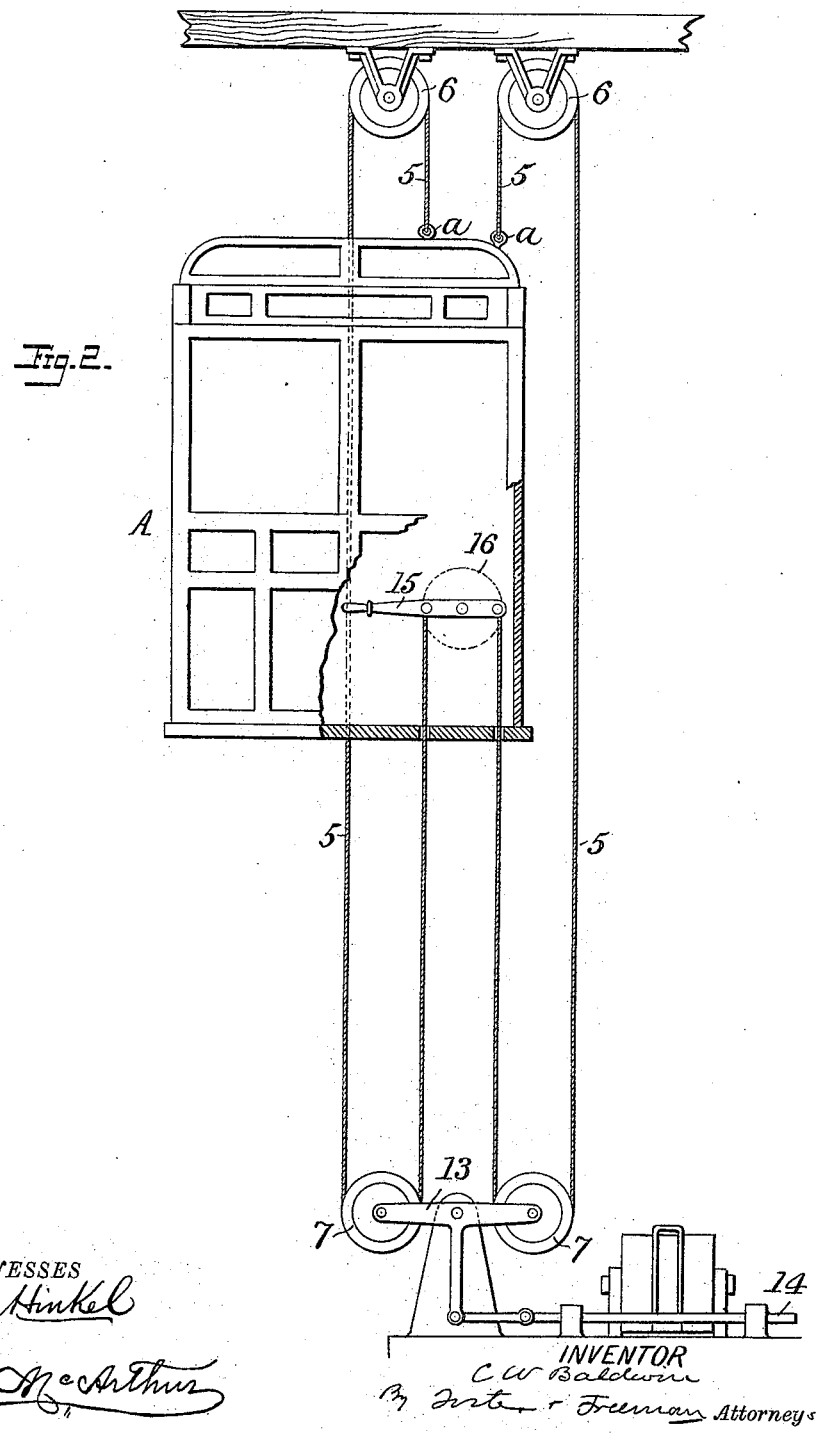

UNITED STATES PATENT OFFICE.

CYRUS W. BALDWIN, OF YONKERS, NEW YORK, ASSIGNOR TO THE NATIONAL COMPANY, OF CHICAGO, ILLINOIS.

CONTROLLING DEVICE FOR ELEVATORS.

SPECIFICATION forming part of Letters Patent No. 529,438, dated November 20, 1894.

Application filed June 13, 1891. Serial No. 396,128. (No model.)

*To all whom it may concern:*

Be it known that I, CYRUS W. BALDWIN, a citizen of the United States, residing at Yonkers, Westchester county, State of New York, have invented certain new and useful Improvements in Controlling Devices for Elevators, of which the following is a specification.

My invention relates to that class of elevating apparatus in which the valve, switch, belt-shifter or other stopping or starting device is operated through the medium of the flexible connection with the cage; and my invention consists in constructing and arranging the connections and operating device therefor, as fully set forth hereinafter so as to avoid projections upon the outside of the cage.

In the accompanying drawings: Figure 1 shows in elevation an hydraulic elevator provided with my improvements. Fig. 2 is a sectional elevation illustrating another arrangement embodying my improvement.

The cage A, and the engine B, may be of any suitable construction, but as shown in Fig. 1 the engine B, is a hydraulic engine provided with circulating, supply and discharge pipes with a main valve device C, with an auxiliary valve operating engine D, which latter has an auxiliary valve F. Shown in dotted lines.

Between the cage A and the stopping and starting valve whether the same is an auxiliary valve or the main valve extends a flexible connection in the form of one or more cables 5, one being shown in Fig. 1, and two in Fig. 2, which cables may be connected directly with the stopping and starting device or indirectly through the medium of other devices, as hereinafter set forth.

Each cable passes at one end over a supporting pulley 6, turning in fixed bearings and at the other around a supporting pulley turning in movable bearings connected with the stopping and starting device and the ends of the cable are connected directly or indirectly with the cage so that when the cage moves vertically within the well the cable will travel therewith round its pulleys and by contracting and relaxing the loop of the cable movement is imparted to the movable pulley and from the latter to the stopping and starting device.

So far as these features broadly are concerned they do not constitute my present invention, but where traveling cables have heretofore been used they have generally been arranged outside of the cage and the operating connections with said cables have also been arranged outside of the cage with attachments extending to inside handles or levers. In some instances the arrangements of the cables and their attachments outside of the cage are objectionable in consequence of the lack of room and the liability of the connecting devices outside of the cage to make contact with the sides of the well or with projecting parts of other cages traveling in contiguous paths and to overcome these objections I arrange the operating device whatever may be its character wholly within the cage and carry the end of the cable or cables to the top or bottom or both of the cage to said device so that there is no projection of any of the parts beyond the area of the cage itself. The parts may be differently arranged to secure this result. As shown in Fig. 1, one end of the cable 5, is attached to a bracket 8, upon the bottom of the cage, passes below the lower pulley 7, which turns in bearings in the stem 18 of the auxiliary valve F, and thence passes upward over the pulley 6, and down through an opening in the top of the cage to the operating device, which in this case is a sliding foot piece 9, lifted by a spring 10, and guided by the bracket 8. With this arrangement the operator by depressing the operating device with his foot can contract the loop of the cable 5, and lift the valve F, and on reducing the pressure the spring 10 lifts the operating device and relaxes the loop when the weight of the valve, or preferably an auxiliary weight 12, depresses the valve.

In the construction shown in Fig. 2 where there are two cables the two pulleys 7 are upon opposite ends of a lever 13, which is connected with the stopping and starting device which may be a switch, valve or, as shown, a belt-shifter bar 14, and each cable is connected at one end to the top of the cage at *a*, and passes through an opening in the bottom of the cage through one end of the operating device, shown in the form of a lever 15, or as shown in dotted lines, the said device may be provided with a pulley 16, to which the ends of the cable are connected at opposite sides of the same.

I do not claim the combination of two traveling cables and an operating device, my invention being limited in this connection to the connection of the cables with the operating device when arranged within the cage thereby avoiding outside connections which sometimes cannot be applied.

Without limiting myself to the precise construction and arrangement of parts shown, I claim—

The combination in an elevator of a car, a cable passing over pulleys above and below the travel of the car, one end being attached to the car, the other end terminating in the car and connected in the car with the operating appliance, and a controlling device connected to be operated by said cable, substantially as set forth.

In testimony whereof I have signed my name to this specification in the presence of two subscribing witnesses.

CYRUS W. BALDWIN.

Witnesses:
MATTHEW K. COUZENS,
JOHN J. CRIMMINS.